United States Patent
Will, IV et al.

(10) Patent No.: US 12,417,355 B2
(45) Date of Patent: Sep. 16, 2025

(54) CHATBOT DISAMBIGUATION

(71) Applicant: ADP, Inc., Roseland, NJ (US)

(72) Inventors: Henry C. Will, IV, Dover, NJ (US); Stefan George Wilk, Martinsburg, WV (US)

(73) Assignee: ADP, Inc., Roseland, NJ (US)

( * ) Notice: Subject to any disclaimer, the term of this patent is extended or adjusted under 35 U.S.C. 154(b) by 391 days.

(21) Appl. No.: 17/812,330

(22) Filed: Jul. 13, 2022

(65) Prior Publication Data
US 2024/0020484 A1    Jan. 18, 2024

(51) Int. Cl.
*G06F 40/35* (2020.01)
*G06F 3/16* (2006.01)
*H04L 51/02* (2022.01)

(52) U.S. Cl.
CPC .............. *G06F 40/35* (2020.01); *G06F 3/167* (2013.01); *H04L 51/02* (2013.01)

(58) Field of Classification Search
CPC ........... G06F 40/35; G06F 3/167; H04L 51/02
See application file for complete search history.

(56) References Cited

U.S. PATENT DOCUMENTS

| | | | | |
|---|---|---|---|---|
| 11,164,562 B2* | 11/2021 | DiMascio | ............. | G10L 15/063 |
| 11,657,797 B2* | 5/2023 | Vishnoi | ................ | G06N 20/00 |
| | | | | 704/260 |
| 11,941,367 B2* | 3/2024 | Lewis | .................... | G06N 5/041 |
| 2020/0342873 A1* | 10/2020 | Teserra | ................. | G06F 40/295 |
| 2021/0067470 A1* | 3/2021 | Freed | ..................... | G06F 18/23 |
| 2022/0050968 A1* | 2/2022 | Xie | ......................... | H04L 51/02 |
| 2023/0142339 A1* | 5/2023 | Getselevich | ............ | G10L 15/16 |
| | | | | 704/275 |

OTHER PUBLICATIONS

Brown, "Choosing Between Multiple Intents With Watson Assistant," Medium, Nov. 1, 2018, accessed Jun. 30, 2022, 10 pages. https://medium.com/@jasonbrown_23038/choosing-between-multiple-intents-with-watson-assistant-7cd28e1ee69c.

"Expression language methods," IBM Cloud Docs, updated Jun. 2, 2022, accessed Jun. 30, 2022, 49 pages. https://cloud.ibm.com/docs/assistant?topic=assistant-dialog-methods#dialog-methods-arrays-get.

(Continued)

*Primary Examiner* — Mohammad K Islam
(74) *Attorney, Agent, or Firm* — Foley & Lardner LLP

(57) ABSTRACT

Disambiguating user utterances is provided. Disambiguation of an utterance of a user is performed using up to a defined number of user intents in a set of possible user intents having highest confidence scores between a first confidence score threshold level and a second confidence score threshold level in response to determining that each user intent in the set of possible user intents does have a corresponding confidence score less than the second confidence score threshold level. Each of the up to the defined number of user intents is located in a user intent mapping table. A human interpretable label corresponding to each of the up to the defined number of user intents located in the user intent mapping table is extracted. Extracted human interpretable labels are assembled into a set of user intent options. The set of user intent options is sent to a client device of the user.

30 Claims, 10 Drawing Sheets

(56) References Cited

OTHER PUBLICATIONS

"Spring Expression Language (SpEL)," Part III. Core Technologies, accessed Jun. 30, 2022, 26 pages. https://docs.spring.io/spring-framework/docs/3.2.x/spring-framework-reference/html/expressions.html.

Sodoherty, "Compound Questions, "Talk to Me Blog, Feb. 6, 2017, accessed Jun. 30, 2022, 6 pages. https://sodoherty.ai/2017/02/06/compound-questions/.

Brink, "Handling Multi-Intent Questions in Watson Assistant," Medium, Sep. 4, 2019, accessed Jun. 30, 2022, 11 pages. https://medium.com/@ryanbrink1/handling-multi-intent-questions-in-watson-assistant-ccd0c6ea21e1.

Sodoherty, "Simple Intent Tricks," Talk to Me Blog, Mar. 29, 2019, accessed Jun. 30, 2022, 7 pages. https://sodoherty.ai/2019/03/29/simple-intent-tricks/.

"How to detect more than one intent with IBM Watson Assistant?" Stack Overflow, accessed Jun. 30, 2022, 3 pages. https://stackoverflow.com/questions/51657570/how-to-detect-more-than-one-intent-with-ibm-watson-assistant.

"Controlling the conversational flow," IBM Cloud Docs, Aug. 8, 2021, accessed Jun. 9, 2022, 24 pages. https://cloud.ibm.com/docs/assistant?topic=assistant-dialog-runtime#/dialog-runtime-disambiguation.

Greyling, "Dealing With Compound User Intents In IBM Watson Assistant," Medium, May 12, 2020, accessed Jul. 13, 2022, 15 pages. https://cobusgreyling.medium.com/dealing-with-compound-user-intents-in-ibm-watson-assistant-4d27f201bc51.

Will et al., "Filtering User Intent Eligibility," U.S. Appl. No. 17/812,338, filed Jul. 13, 2022, 35 pages.

\* cited by examiner

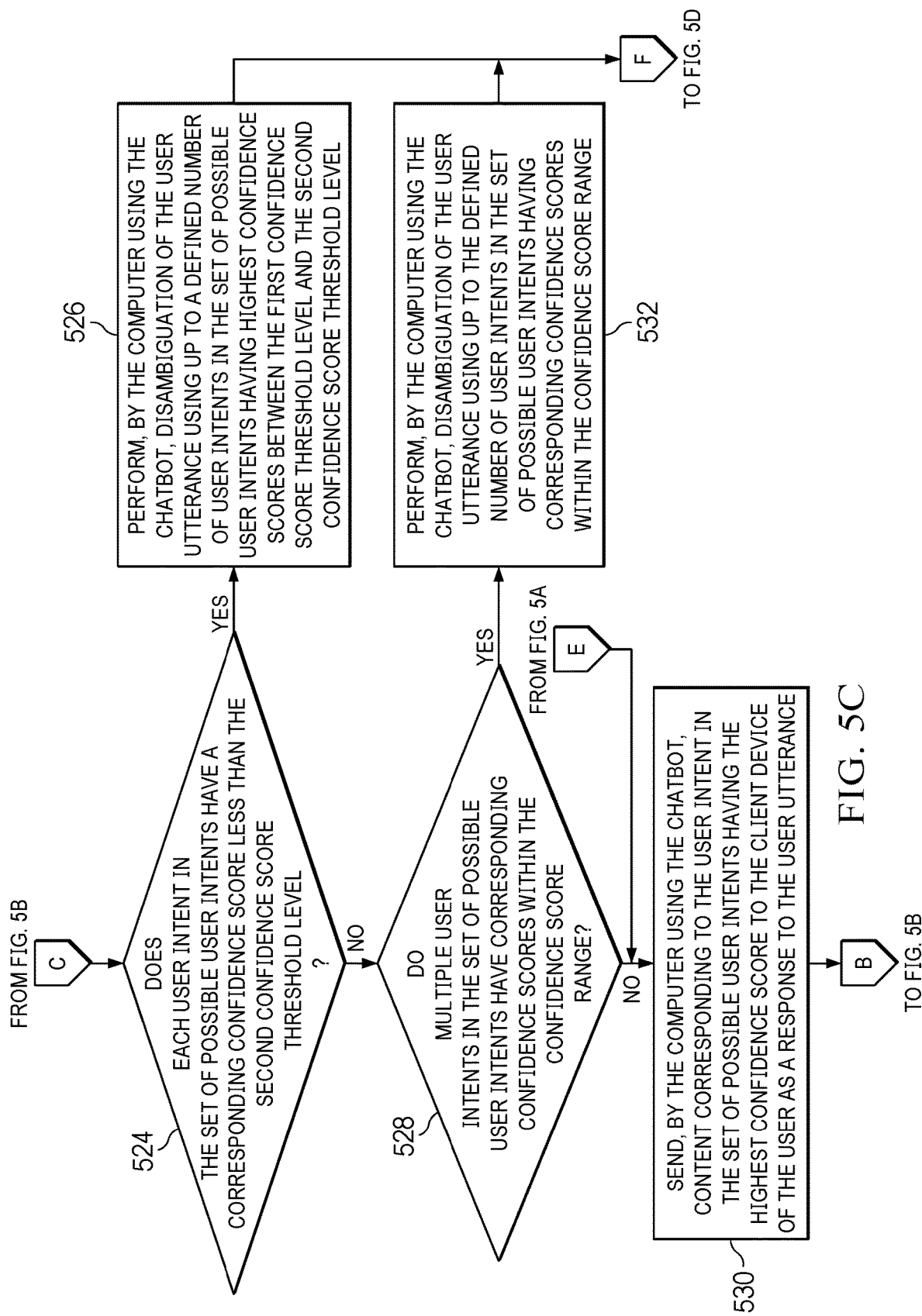

CHATBOT DISAMBIGUATION

BACKGROUND

1. Field

The disclosure relates generally to chatbots and more specifically to a chatbot disambiguating user utterances to determine user intent.

2. Description of the Related Art

A chatbot is a computer program designed to simulate conversation with human users, especially via the Internet. Typically, a conversation with a chatbot is a back-and-forth dialog, such as a user makes an initial request, the chatbot replies, the user then responds to the chatbot reply, and so on. Based on what the user inputs, the chatbot typically knows how to respond to the user. Thus, the chatbot is designed to simulate the way a human would behave as a conversational partner.

Chatbots are used in dialog systems for various purposes, such as, for example, customer support, request routing, information gathering, and the like. Generally, chatbots utilize natural language understanding to analyze what the user is requesting and respond with coded responses or conversations.

SUMMARY

According to one illustrative embodiment, a computer-implemented method for disambiguating user utterances is provided. A computer, using a chatbot, performs disambiguation of a user utterance of a user using up to a defined number of user intents in a set of possible user intents having highest confidence scores between a first confidence score threshold level and a second confidence score threshold level in response to the computer determining that each user intent in the set of possible user intents does have a corresponding confidence score less than the second confidence score threshold level. The computer, using the chatbot, locates each of the up to the defined number of user intents in a user intent mapping table. The computer, using the chatbot, extracts a human interpretable label corresponding to each of the up to the defined number of user intents located in the user intent mapping table. The computer, using the chatbot, assembles a set of button labels corresponding to the up to the defined number of user intents into a set of user intent options. The computer, using the chatbot, sends the set of user intent options to a client device of the user.

According to another illustrative embodiment, a computer system for disambiguating user utterances is provided. The computer system comprises a bus system, a storage device storing program instructions connected to the bus system, and a processor executing the program instructions connected to the bus system. The computer system, using a chatbot, performs disambiguation of a user utterance of a user using up to a defined number of user intents in a set of possible user intents having highest confidence scores between a first confidence score threshold level and a second confidence score threshold level in response to the computer system determining that each user intent in the set of possible user intents does have a corresponding confidence score less than the second confidence score threshold level. The computer system, using the chatbot, locates each of the up to the defined number of user intents in a user intent mapping table. The computer system, using the chatbot, extracts a human interpretable label corresponding to each of the up to the defined number of user intents located in the user intent mapping table. The computer system, using the chatbot, assembles a set of human readable labels corresponding to the up to the defined number of user intents into a set of user intent options. The computer system, using the chatbot, sends the set of user intent options to a client device of the user.

According to another illustrative embodiment, a computer program product for disambiguating user utterances is provided. The computer program product comprises a computer readable storage medium having program instructions embodied therewith, the program instructions executable by a computer to cause the computer to perform a method. The computer, using a chatbot, performs disambiguation of a user utterance of a user using up to a defined number of user intents in a set of possible user intents having highest confidence scores between a first confidence score threshold level and a second confidence score threshold level in response to the computer determining that each user intent in the set of possible user intents does have a corresponding confidence score less than the second confidence score threshold level. The computer, using the chatbot, locates each of the up to the defined number of user intents in a user intent mapping table. The computer, using the chatbot, extracts a human interpretable label corresponding to each of the up to the defined number of user intents located in the user intent mapping table. The computer, using the chatbot, assembles a set of human interpretable labels corresponding to the up to the defined number of user intents into a set of user intent options. The computer, using the chatbot, sends the set of user intent options to a client device of the user.

According to another illustrative embodiment, a method for disambiguating user utterances is provided. Disambiguation of a user utterance of a user is performed using a set of possible user intents having highest confidence scores between a first confidence score threshold level and a second confidence score threshold level in response to determining that each user intent in the set of possible user intents does have a corresponding confidence score less than the second confidence score threshold level. Each of the set of possible user intents is located in a user intent mapping table. A label corresponding to each of the set of possible user intents located in the user intent mapping table is extracted. A set of labels corresponding to the set of possible user intents are assembled into a set of user intent options. The set of user intent options is sent to a client device of the user.

BRIEF DESCRIPTION OF THE DRAWINGS

FIGS. 5A-5E are a flowchart illustrating a process for disambiguating user utterances in accordance with an illustrative embodiment.

DETAILED DESCRIPTION

Figure 1:
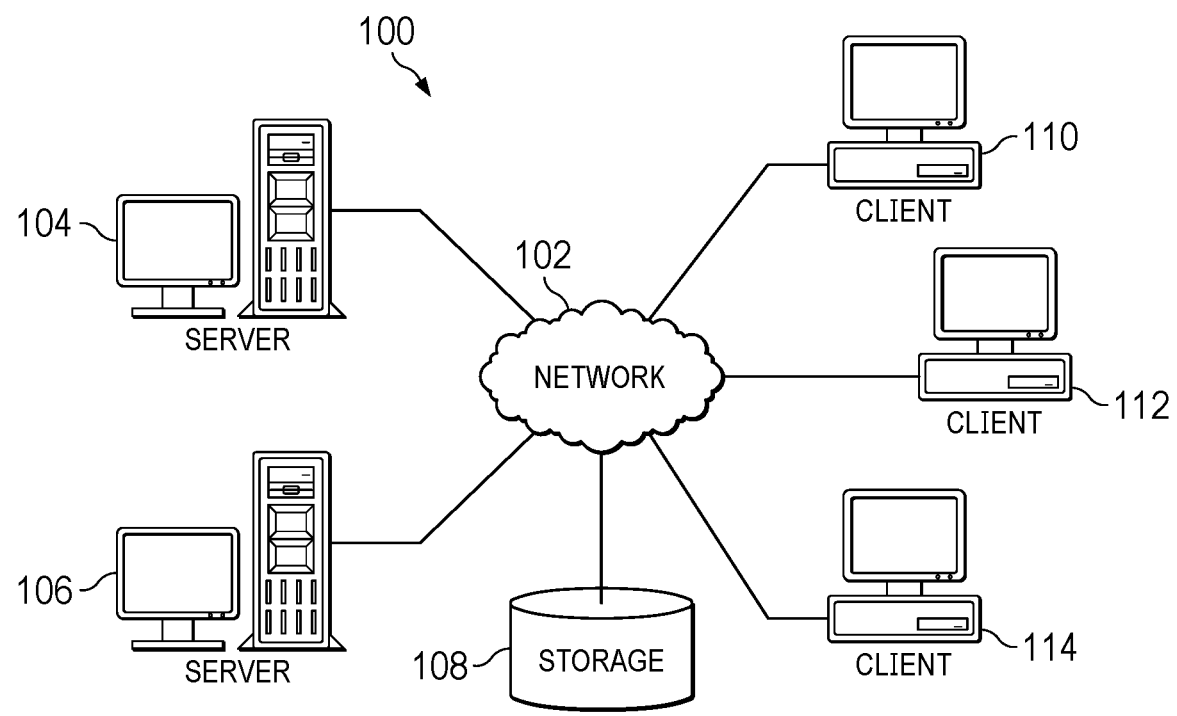
FIG. 1 is a pictorial representation of a network of data processing systems in which illustrative embodiments may be implemented.
Figure 2:
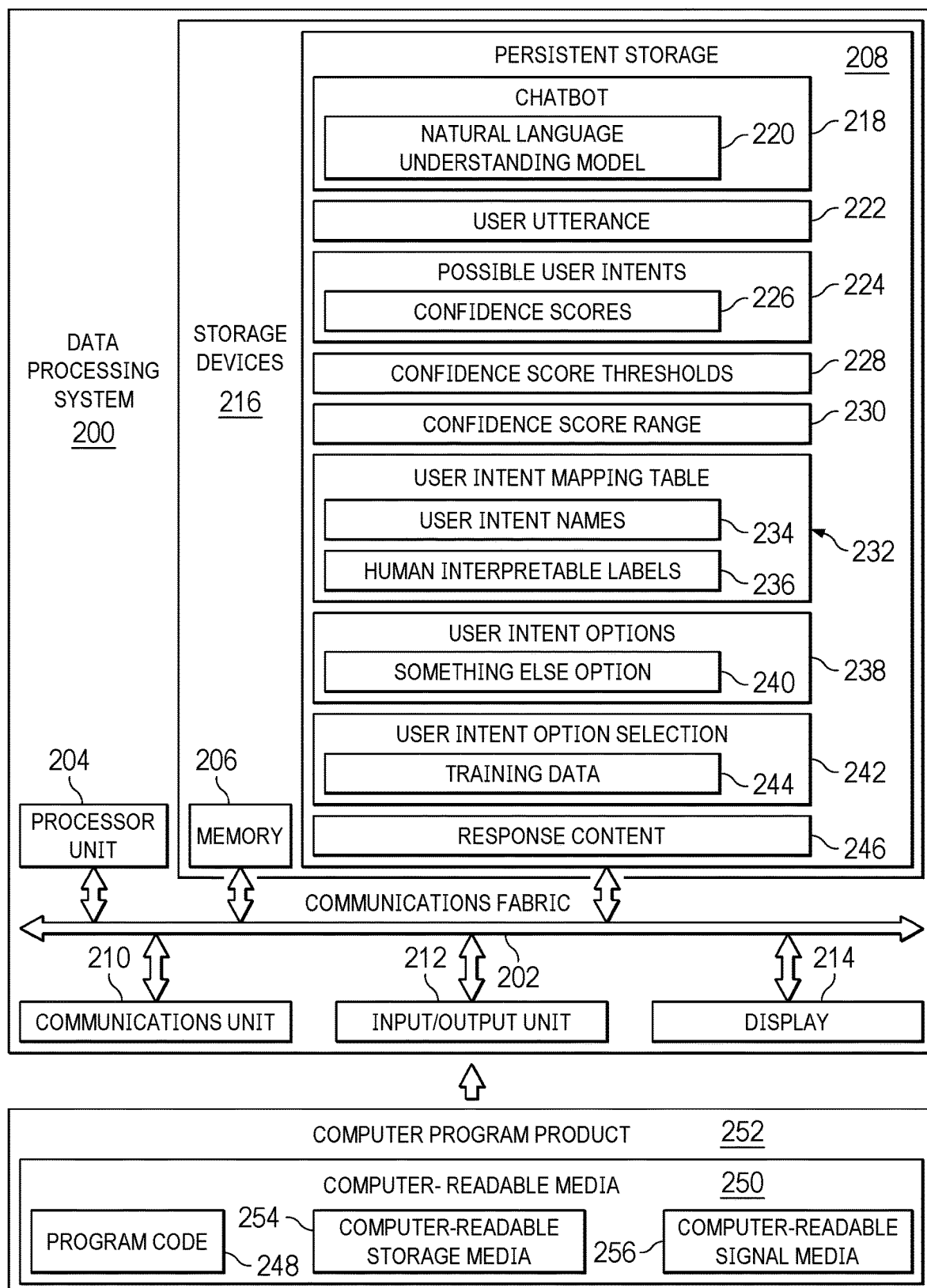
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. Also, server 104 and server 106 may each represent a cluster of servers in one or more data centers. Alternatively, server 104 and server 106 may each represent multiple computing nodes in one or more cloud environments.

In addition, server 104 and server 106 provide services, such as, for example, financial services, banking services, governmental services, educational services, healthcare services, reservation services, retail services, data services, and the like, to client device users. Further, server 104 and server 106 may utilize a chatbot to provide assistance to the client device users regarding services provided by server 104 and server 106. For example, the chatbot can provide answers to initial questions, provide informational content corresponding to the services hosted by server 104 and server 106, provide routing guidance, and the like, to requests submitted by the client device users.

In some cases, the chatbot may determine that more than one possible user intent can be correct for a user request. Ideally, the chatbot should be trained to identify the intent that best matches what the user is requesting. However, there are times when the intent with the second or third highest confidence score will lead the user to desired content.

Consequently, instead of defaulting to an intent with a highest confidence score, the chatbot should check the confidence scores of a number of top matching intents (e.g., two, three, or the like). Thus, the chatbot can return a list of possible user intent options to the user sorted by how confident the chatbot is that an intent matches the user's request. Also, if confidence scores of possible user intents are within a defined confidence score range (e.g., 80% of the highest confidence score), then the chatbot may determine that not just one single intent will address the user's request. As a result, the chatbot will present a number of top matching user intents, up to a defined number of user intents (e.g., three), to the user for disambiguation of the user's request (i.e., utterance).

Thus, disambiguation allows the chatbot to request clarification of user intent from the user. In other words, disambiguation allows the user to disambiguate the dialog by selecting the best-suited user intent option from the list of top matching user intents. Disambiguation can be triggered when the confidence scores of matching user intents, which are relevant to the context of the inputted user utterance, are within the defined confidence score range of the highest scoring user intent. However, the list presented to the user by the chatbot should be relevant to the context of the user utterance. Therefore, the chatbot only presents contextually relevant user intent options in the list.

The chatbot utilizes the user's selection from the list of presented user intent options (i.e., user feedback) to improve user intent predictions by a natural language understanding model of the chatbot using training data vetted by the user. Disambiguation autolearning increases the quality of disambiguation over time. Autolearning applies insights gained from observing interactions between the chatbot and users to assist in identifying and providing the correct content to users more often over time with increased predictive accuracy.

As an illustrative example, when a user submits an utterance to the chatbot that the chatbot may not be able to accurately determine the intent of the user with a high degree of certainty, the chatbot can offer a list of user intent options to the user and request that the user select an appropriate user intent option for disambiguation of the submitted utterance. If the chatbot shows a similar list of user intent options to other users and these other users select the same user intent option (e.g., user intent option #2) most often in the list, then the chatbot can learn from those user interaction experiences. In other words, the chatbot can learn that user intent option #2 is the best option to that particular type of user utterance. Thus, the next time the chatbot receives that particular type of user utterance, the chatbot can place user intent option #2 at the top of the list enabling users to see that particular option more quickly. Further, if this user pattern of selecting user intent option #2 for that particular type of user utterance persists over time, then the chatbot can change its behavior even more. For example, instead of making the user select from a list of user intent options, the chatbot can return user intent option #2 as the response immediately. Thus, the chatbot can eventually show the correct option to the user automatically. Therefore, the chatbot can automatically learn how to disambiguate a user utterance.

Client 110, client 112, and client 114 also connect to network 102. Clients 110, 112, and 114 are client devices of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld or tablet computers, smart phones, smart watches, smart glasses, smart televisions, smart vehicles, smart appliances, virtual reality devices, gaming devices, kiosks, and the like, with wire or wireless communication links to network 102. Users of clients 110, 112, and 114 may utilize clients 110, 112, and 114 to access and utilize the chatbot services provided by server 104 and server 106. Further, server 104 and server 106 may provide other information, such as, for example, applications, programs, files, data, and the like to clients 110, 112, and 114.

Storage 108 is a network storage device capable of storing any type of data in a structured format or an unstructured format. In addition, storage 108 may represent a plurality of network storage devices. Further, storage 108 may store identifiers and network addresses for a plurality of client devices, identifiers for a plurality of client device users, user intent confidence score threshold levels, user intent confidence score ranges, user intent mapping tables, and the like. Furthermore, storage 108 may store other types of data, such as authentication or credential data that may include usernames, passwords, and the like associated with, for example, client device users and system administrators.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a wide area network, a metropolitan area network, a local area network, a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference now to FIG. 2, a diagram of a data processing system is depicted in accordance with an illustrative embodiment. Data processing system 200 is an example of a computer, such as server 104 in FIG. 1, in which computer readable program code or instructions implementing the user utterance disambiguation processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer readable storage device or computer readable storage medium is any piece of hardware that is capable of storing information, such as, for example, without limitation, data, computer readable program instructions in functional form, and/or other suitable information either on a transient basis or a persistent basis. Further, a computer readable storage device or computer readable storage medium excludes a propagation medium, such as a transitory signal. Memory 206, in these examples, may be, for example, a random-access memory, or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores chatbot 218. However, it should be noted that even though chatbot 218 is illustrated as residing in persistent storage 208, in an alternative illustrative embodiment chatbot 218 may be a separate component of data processing system 200. For example, chatbot 218 may be a hardware component coupled to communication fabric 202 or a combination of hardware and software components.

Chatbot 218 controls the process of disambiguating user utterances to determine user intent. In this example, chatbot 218 includes natural language understanding model 220. However, it should be noted that even though natural language understanding model 220 is shown as being included in chatbot 218, natural language understanding model 220 may be a separate or stand-alone component. Chatbot 218 utilizes natural language understanding model 220 to read and understand incoming user utterances to determine intent of users regarding the utterances.

Natural language understanding model 220 utilizes deep learning to extract meaning from unstructured user utterances. Natural language understanding model 220 utilizes analytics to extract, for example, context, classifications, categories, keywords, sentiment, relations, syntax, and the like from these unstructured user utterances. Natural language understanding model 220 also provides intent recognition to identify a user's objective regarding a particular utterance by establishing the meaning of the utterance. Thus, natural language understanding model 220 enables interaction between users and chatbot 218.

User utterance 222 represents a current textual message input by a user of a client device, such as client 110 in FIG. 1, into chatbot 218 via a chatbot dialog user interface. User utterance 222 may be, for example, a question submitted by the client device user regarding a service provided by data processing system 200, a request for information, or the like. In response to receiving user utterance 222, chatbot 218 utilizes natural language understanding model 220 to generate possible user intents 224 and confidence scores 226. Possible user intents 224 represent a set of predicted user intents corresponding to the context of user utterance 222. Confidence scores 226 represent scores relative to the level of confidence that natural language understanding model 220 has in predicting each respective user intent of possible user intents 224 that corresponds to the context of current user utterance 222.

Confidence score thresholds 228 represent a plurality of confidence score threshold levels, such as a low confidence score threshold level (0.3), a medium confidence score threshold level (0.5), and the like. Natural language understanding model 220 utilizes confidence score thresholds 228 to determine how well natural language understanding model 220 understands the user's actual intent regarding user utterance 222. For example, if natural language understanding model 220 determines that all of confidence scores 226 of possible user intents 224, which correspond to user utterance 222, are less than the low confidence score threshold level, then natural language understanding model 220 determines that natural language understanding model 220 is not able to interpret user utterance 222 as to possible user intent and that natural language understanding model 220 needs to request that the client device user rephrase user utterance 222. Further, chatbot 218 can utilize confidence score range 230 (e.g., 80%) to determine a group of user intents from possible user intents 224, up to a defined number of user intents (e.g., 2, 3, 4, et cetera), which are within confidence score range 230 of a highest scoring user intent. Furthermore, chatbot 218 can utilize a configurable confidence score range for each respective confidence score threshold value (e.g., the low confidence score threshold value, the medium confidence threshold value, and the like) in confidence score thresholds 228.

After identifying possible user intents 224, chatbot 218 utilizes user intent mapping table 232 to map user intent names 234, which corresponds to each of possible user intents 224, to human interpretable labels 236. User intent names 234 represent a plurality of names or identifiers for defined user intents. Human interpretable labels 236 represent a plurality of different text labels to be applied to buttons provided in a chatbot dialog interface as user intent options 238. It should be noted that a one-to-one relationship exists between each respective user intent name and each respective human interpretable label in user intent mapping table 232.

Chatbot 218 presents user intent options 238 to the client device user for disambiguation of user utterance 222 when more than one possible user intent can apply to user utterance 222 (e.g., multiple possible user intents having similar confidence scores within confidence score range 230). Furthermore, chatbot 218 adds something else option 240 to user intent options 238. Something else option 240 provides the client device user with an alternative option when user intent options 238 do not accurately reflect the user's actual intent regarding user utterance 222.

Subsequently, chatbot 218 receives user intent option selection 242. User intent option selection 242 represents a selection of one of user intent options 238, which includes something else option 240, by the client device user via the chatbot dialog user interface. Chatbot 218 can utilize user intent option selection 242 as training data 244 for natural language understanding model 220 to increase the predictive user intent accuracy of natural language understanding model 220 over time. In addition, based on user intent option selection 242, chatbot 218 sends response content 246 to the client device user via the chatbot dialog user interface. Response content 246 may be, for example, an answer to a question submitted by the client device user, information requested by the client device user regarding a particular service, a statement by chatbot 218 requesting clarification from the client device user, or the like.

As a result, data processing system 200 operates as a special purpose computer system in which chatbot 218 in data processing system 200 enables disambiguation of user utterances to determine user intent. In particular, chatbot 218 transforms data processing system 200 into a special purpose computer system as compared to currently available general computer systems that do not have chatbot 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity, Bluetooth® technology, global system for mobile communications, code division multiple access, second-generation, third-generation, fourth-generation, fourth-generation long term evolution, long term evolution advanced, fifth-generation, or any other wireless communication technology or standard to establish a wireless communications link for data processing system 200. Bluetooth is a registered trademark of Bluetooth Sig, Inc., Kirkland, Washington.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 248 is located in a functional form on computer readable media 250 that is selectively removable and may be loaded onto or transferred to data processing system 200 for running by processor unit 204. Program code 248 and computer readable media 250 form computer program product 252. In one example, computer readable media 250 may be computer readable storage media 254 or computer readable signal media 256.

In these illustrative examples, computer readable storage media 254 is a physical or tangible storage device used to store program code 248 rather than a medium that propagates or transmits program code 248. In other words, computer readable storage media 254 exclude a propagation medium, such as transitory signals. Computer readable storage media 254 may include, for example, an optical or magnetic disc that is inserted or placed into a drive or other device that is part of persistent storage 208 for transfer onto a storage device, such as a hard drive, that is part of persistent storage 208. Computer readable storage media 254 also may take the form of a persistent storage, such as a hard drive, a thumb drive, or a flash memory that is connected to data processing system 200.

Alternatively, program code 248 may be transferred to data processing system 200 using computer readable signal media 256. Computer readable signal media 256 may be, for example, a propagated data signal containing program code 248. For example, computer readable signal media 256 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer readable media 250" can be singular or plural. For example, program code 248 can be located in computer readable media 250 in the form of a single storage device or system. In another example, program code 248 can be located in computer readable media 250 that is distributed in multiple data processing systems. In other words, some instructions in program code 248 can be located in one data processing system while other instructions in program code 248 can be located in one or more other data processing systems. For example, a portion of program code 248 can be located in computer readable media 250 in a server computer while another portion of program code 248 can be located in computer readable media 250 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 248.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Sometimes when a user provides an utterance (e.g., a textual message, a verbal message, or the like) to a chatbot, depending on chatbot training, the chatbot may not be able to accurately determine the intent of the user (e.g., what the user is requesting such as an answer to a question, information regarding a particular subject, routing guidance, or the like) with a high level of certainty. It should be noted that as used herein, a chatbot can include a voice assistant. In other words, a user may input a verbal message, the chatbot then transcribes the user's verbal message to text, analyzes the text to determine a response, converts the response to a computer-generated voice response, and outputs the computer-generated voice response to the user.

Previously, a chatbot needed to be coded to ask additional questions for clarification of user intent when the classifier confidence level was not high. In addition, the conversation flow would have to allow the user to exit the conversation with the chatbot when the classifier incorrectly classified the intent of the user.

Disambiguation enables a chatbot to ask questions of the user when the chatbot is not highly confident regarding what the user is requesting. The chatbot of illustrative embodiments presents user intent options to the user to allow the user to disambiguate or clarify what the user is requesting. The number of user intent options presented by the chatbot of illustrative embodiments can vary depending on how many user intents, which match the current user utterance, have a confidence score within a configurable confidence score range of a highest user intent confidence score determined by a natural language understanding model of the chatbot.

Disambiguation presents multiple user intent options to a chatbot end user to enable the chatbot end user to clarify uncertain user utterance classifications made by the natural language understanding model of the chatbot. The chatbot of illustrative embodiments utilizes multiple, configurable intent confidence score threshold levels, extended disambiguation features, and a plurality of disambiguation rules to clarify the uncertain user utterance classifications made by the natural language understanding model of the chatbot. For example, the chatbot of illustrative embodiments may utilize one disambiguation rule when the chatbot determines that a confidence score of a user intent corresponding to a current user utterance is less than a configurable low confidence score threshold level (e.g., 0.3). In response to the chatbot of illustrative embodiments determining that the confidence score of the user intent corresponding to the current user utterance is less than the low confidence score threshold level, the chatbot determines that the chatbot does not understand the current user utterance and requests that the user rephrase that particular user utterance for clarification. The chatbot of illustrative embodiments may utilize another disambiguation rule when the chatbot determines that the confidence score of the user intent corresponding to the current user utterance is less than a configurable medium confidence score threshold level (e.g., 0.5) but greater than the low confidence score threshold level. In response to the chatbot of illustrative embodiments determining that the confidence score of the user intent corresponding to the current user utterance is less than the medium confidence score threshold level but greater than the low confidence score threshold level, the chatbot presents up to three user intent options to the user for disambiguation. The chatbot of illustrative embodiments may utilize yet another disambiguation rule when the chatbot determines that the confidence score of the user intent corresponding to the current user utterance is greater than the medium confidence score threshold level. In response to the chatbot of illustrative embodiments determining that the confidence score of the user intent corresponding to the current user utterance is greater than the medium confidence score threshold level, the chatbot compares up to three user intents that have confidence scores within a confidence score range (e.g., 80%) of the highest user intent confidence score corresponding to the current user utterance.

As an illustrative example, if a top user intent name corresponding to the current user utterance has a confidence score (e.g., 1.0), which is greater than the medium confidence score threshold level (e.g., 0.5), then the chatbot of illustrative embodiments determines whether a set of one or more (e.g., up to three) other user intent names corresponding to the current user utterance is within the defined range (e.g., 80%) of highest confidence scoring user intent name (e.g., user intent names having confidence scores between 0.8 and 1.0). As another illustrative example, if the top user intent name corresponding to the current user utterance has a confidence score of 0.9, which is greater than the medium confidence score threshold level of 0.5, then the chatbot of illustrative embodiments determines whether a set of one or more other user intent names corresponding to the current user utterance is within the defined range of 80% of the highest confidence scoring user intent name at 0.9 (e.g., user intent names having confidence scores between 0.72 and 0.9). As yet another illustrative example, if the top user intent name corresponding to the current user utterance has a confidence score of 0.5, which is equal to the medium confidence score threshold level of 0.5, then the chatbot of illustrative embodiments determines whether a set of one or more other user intent names corresponding to the current user utterance is within the defined range of 80% of the highest confidence scoring user intent name at 0.5 (e.g., user intent names having confidence scores between 0.4 and 0.5).

The chatbot of illustrative embodiments then presents the user intent disambiguation options, up to a defined number of options (e.g., 3), to the user, along with a "Something Else" option as an alternative if the other options in the list do not match the user's true intent. Similarly, if the top user intent name corresponding to the current user utterance has a confidence score that is less than the medium confidence score threshold level, then the chatbot of illustrative embodiments determines whether the confidence score is greater than the low confidence threshold level (e.g., 0.3). If the top user intent name corresponding to the current user utterance has a confidence score between the medium and the low confidence score threshold levels, then the chatbot of illustrative embodiments identifies one, two, or three other user intent names that have a confidence score greater than the low confidence threshold level. Afterward, the chatbot of illustrative embodiments displays the user intent disambiguation options up to the defined number of user intent disambiguation options to the user, along with the "Something Else" alternative option.

The chatbot of illustrative embodiments utilizes a user intent mapping table (e.g., a JavaScript Object Notation (JSON) array, lookup table, or the like) to map a user intent name to a human interpretable label (i.e., text) for a button of a user intent option for disambiguation. Whenever a new user intent name is added to the chatbot, three requirements need to be met. First, the new user intent name must be added to the user intent mapping table. Second, the human interpretable label for the disambiguation button of the user intent option corresponding to the new user intent name must be added to the user intent mapping table. Third, the text of the human interpretable label for the disambiguation button corresponding to the new user intent name must be added to a user intent sample training dataset for the natural language understanding model of the chatbot and that text must not be used for training any other user intent names. In other words, the three requirements are: 1) the user intent mapping table must be updated with all intent names, including any new intent names; 2) the corresponding human interpretable labels for disambiguation buttons must be updated in the user intent mapping table; and 3) the text of the label for each respective user intent name in the mapping table must be used as a training data sample for that particular user intent name and no other user intent names. The chatbot of illustrative embodiments also automatically validates that the three requirements are met prior to utilizing a particular user intent name. Also, it should be understood that a one-to-one mapping between user intent names and corresponding human interpretable labels for disambiguation buttons is maintained in the user intent mapping table.

Below are a few examples of JSON entries in the user intent mapping table or JSON array:

```
{
    "intent": "UC_HR_Business_Partner",
    "label": "HR Business Partner Contact Info"
};
{
    "intent": "BASE_get_card".
    "label": "Get or Replace Insurance Card"
}; and
{
    "intent": "UC_PTO_balance",
    "label": "View PTO Balance"
}.
```

The chatbot of illustrative embodiments copies the user intent names every turn into another table entitled user intent mapping table copy. Then, the chatbot of illustrative embodiments filters the user intent mapping table copy by replacing any underscore or dash in a respective intent name with a space and removing "UC", which indicates a use case, or "BASE", which indicates a base intent name, from that respective intent name. The chatbot of illustrative embodiments filters out "UC_" and "BASE_" from the intent names in the user intent mapping table copy so that "UC_" and "BASE_" do not appear in user intent options that the chatbot presents to the user for disambiguation of the user's current utterance.

The algorithmic disambiguation of illustrative embodiments operates via the following example process. The chatbot of illustrative embodiments determines whether disambiguation is triggered by detecting whether a disambiguation context variable flag is set to false or not and identifying confidence scores of a top number of possible user intents corresponding to the current user utterance. If disambiguation is triggered, then illustrative embodiments set the disambiguation context variable flag to true, display user intent options that were identified by finding corresponding human interpretable labels (e.g., disambiguation button text) that represent the user's possible intent, receive a user selection of a user intent option from the list of user intent options, utilize the user-selected button text as a new user utterance, and set the disambiguation context variable flag back to false in response to the chatbot providing a response to the user. It should be noted that if the user selects the "Something Else" user intent option from the list of user intent options, then the chatbot may, for example, apologize for not being able to understand what the user is requesting, present the user with a set of new user intent options (e.g., please rephrase the previous user utterance), and set the disambiguation context variable flag back to false.

Thus, illustrative embodiments provide one or more technical solutions that overcome a technical problem with an inability of current chatbots to disambiguate user utterances to determine user intent. As a result, these one or more technical solutions provide a technical effect and practical application in the field of chatbots.

Figure 3:
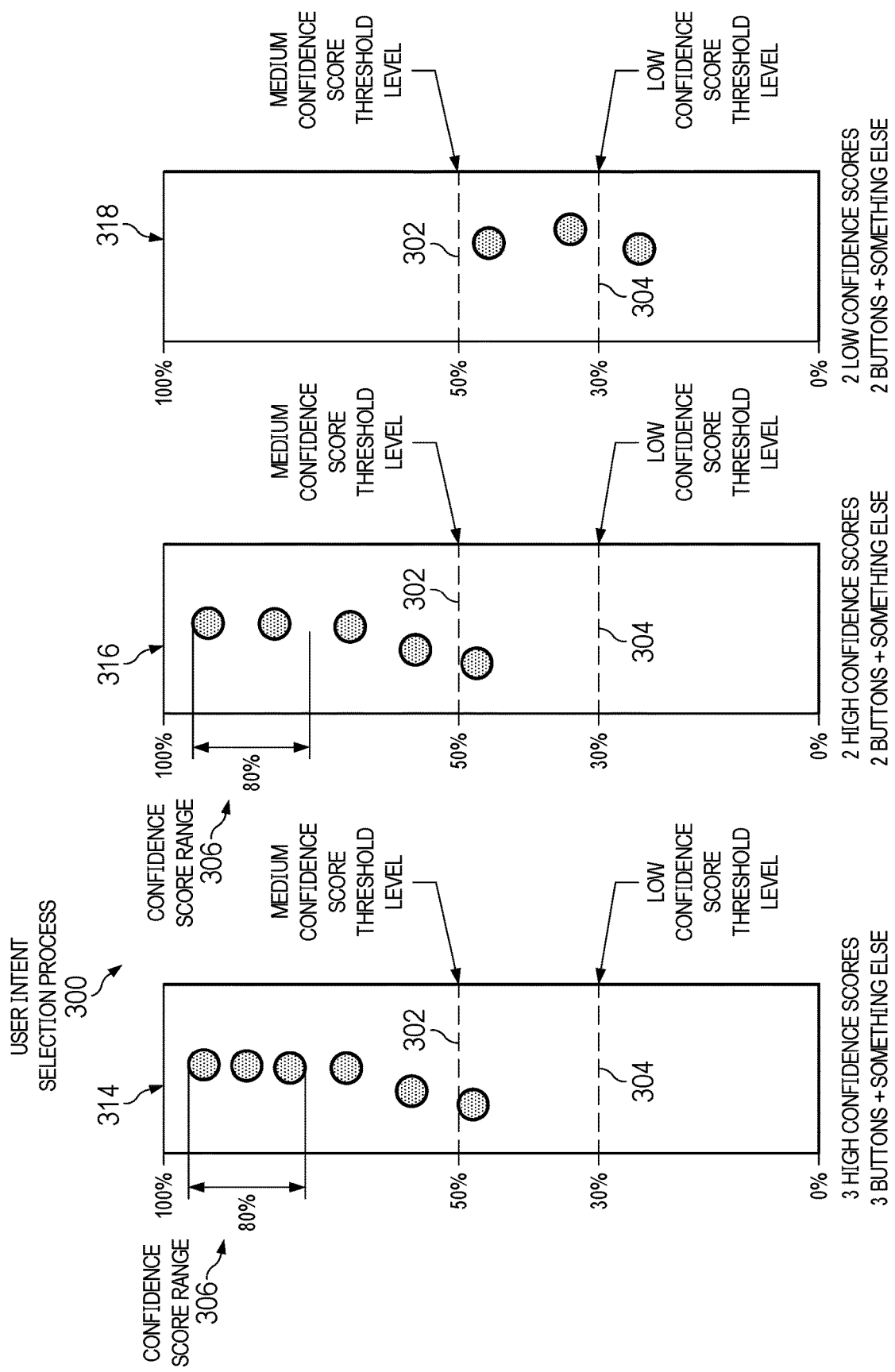
FIG. 3 is a diagram illustrating an example of a user intent selection process in accordance with an illustrative embodiment.

With reference now to FIG. 3, a diagram illustrating an example of a user intent selection process is depicted in accordance with an illustrative embodiment. User intent selection process 300 may be implemented in a computer, such as, for example, server 104 in FIG. 1 or data processing system 200 in FIG. 2. For example, user intent selection process 300 can be implemented in natural language understanding model 220 of chatbot 218 in FIG. 2.

The natural language understanding model utilizes user intent selection process 300 to generate user intent options, such as, for example, user intent options 238 in FIG. 2, for a user to disambiguate a current user utterance, such as, for example, user utterance 222 in FIG. 2, submitted by the user to the chatbot. In this example, user intent selection process 300 includes medium confidence score threshold level 302, low confidence score threshold level 304, confidence score range 306, confidence scores 308, confidence scores 310, and confidence scores 312.

Medium confidence score threshold level 302 and low confidence score threshold level 304 may be, for example, confidence score thresholds 228 in FIG. 2. In this example, medium confidence score threshold level 302 is 50% (i.e., 0.5) and low confidence score threshold level 304 is 30% (i.e., 0.3). However, it should be noted that medium confidence score threshold level 302 and low confidence score threshold level 304 are configurable thresholds and may be manually set by a system administrator or automatically set by the natural language understanding model as needed. Confidence score range 306 may be, for example, confidence score range 230 in FIG. 2. In this example, confidence score range 306 is 80% (i.e., 0.8). However, it should be noted that confidence score range 306 is a configurable range and may be manually set by the system administrator or automatically set by the natural language understanding model as needed. Each of confidence score of confidence scores 308, confidence scores 310, and confidence scores 312 corresponds to possible user intents and may be, for example, confidence scores 226 corresponding to possible user intents 224 in FIG. 2.

In example 314, confidence scores 308 include six confidence scores, with one confidence score below medium confidence score threshold level 302 and five confidence scores above medium confidence score threshold level 302. However, it should be noted that three of the five confidence scores 308 above medium confidence score threshold level 302 are within confidence score range 306 of the highest confidence score of a possible user intent. As a result, the chatbot generates three buttons with human interpretable labels corresponding to the three user intents associated with the three confidence scores within confidence score range 306 as user intent options to be presented to a client device user, along with a something else option, for selection via a chatbot dialog user interface by the client device user for disambiguation of a current user utterance. The user intent options, along with the something else option, may be, for example, user intent options 238 and something else option 240 in FIG. 2.

In example 316, confidence scores 310 include five confidence scores, with one confidence score below medium confidence score threshold level 302 and four confidence scores above medium confidence score threshold level 302. However, it should be noted that two of the four confidence scores 308 above medium confidence score threshold level 302 are within confidence score range 306 of the highest confidence score of a possible user intent. As a result, the chatbot generates two buttons with human interpretable labels corresponding to the two user intents associated with the two confidence scores within confidence score range 306 as user intent options to be presented to the client device user, along with the something else option, for selection via the chatbot dialog user interface by the client device user for disambiguation of the current user utterance.

In example 318, confidence scores 312 include three confidence scores, with one confidence score below low confidence score threshold level 304 and two confidence scores between low confidence score threshold level 304 and medium confidence score threshold level 302. As a result, the chatbot generates two buttons with human interpretable labels corresponding to the two user intents associated with the two confidence scores between low confidence score threshold level 304 and medium confidence score threshold level 302 as user intent options to be presented to the client device user, along with the something else option, for selection via the chatbot dialog user interface by the client device user for disambiguation of the current user utterance.

Figure 4:
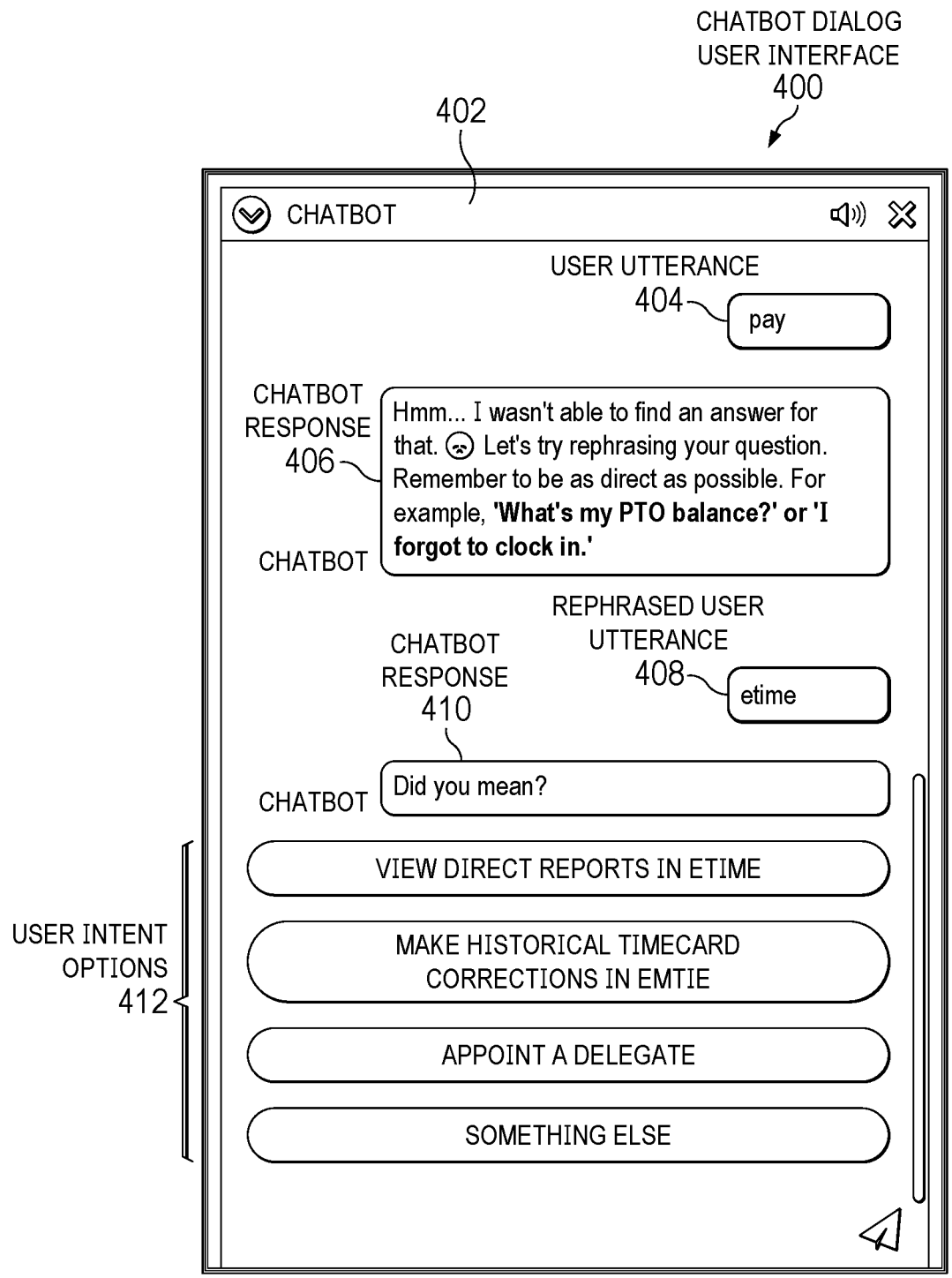
FIG. 4 is a diagram illustrating an example of a chatbot dialog user interface in accordance with an illustrative embodiment.
Figure 5A:
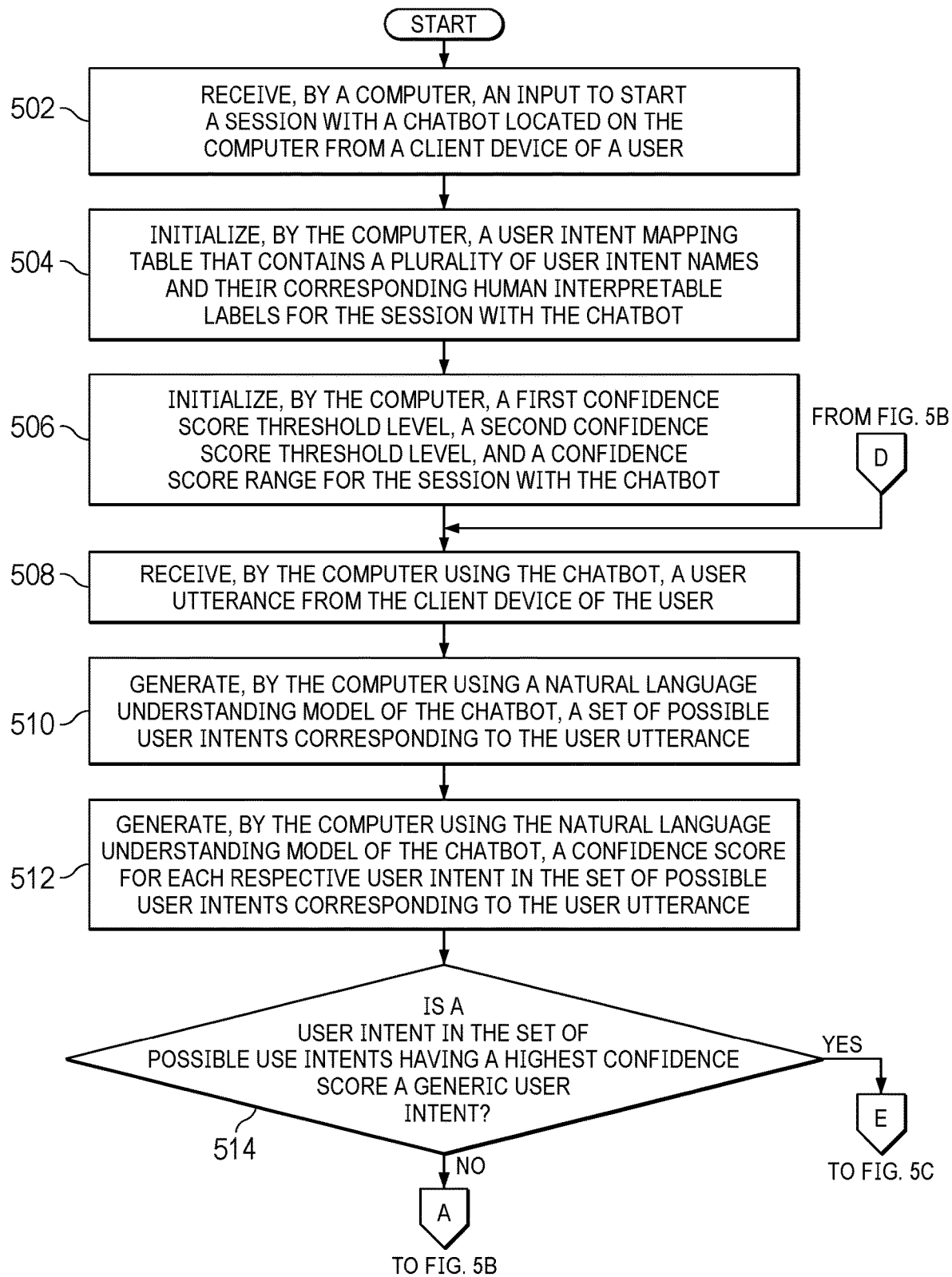
Figure 5B:
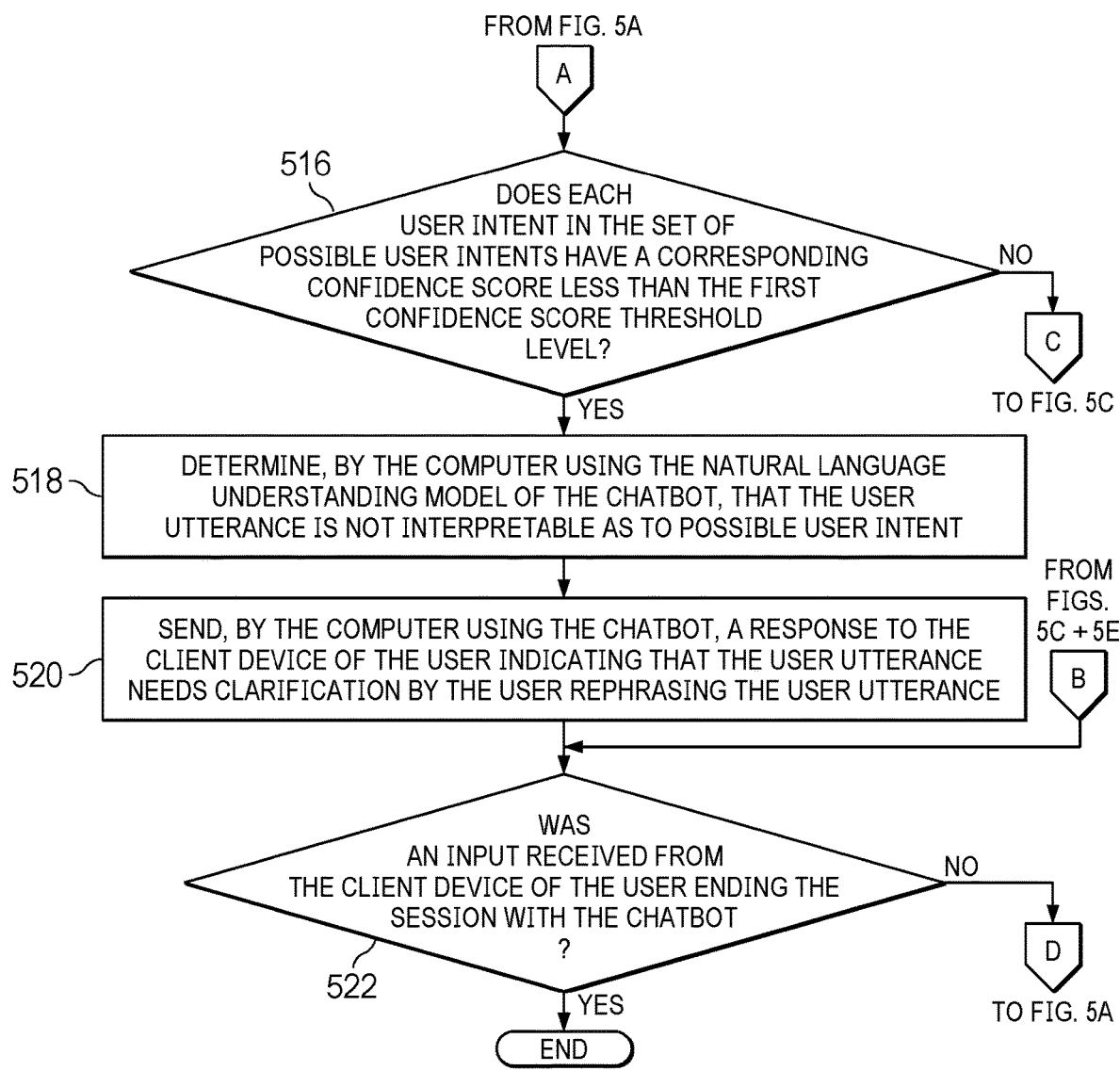
Figure 5D:
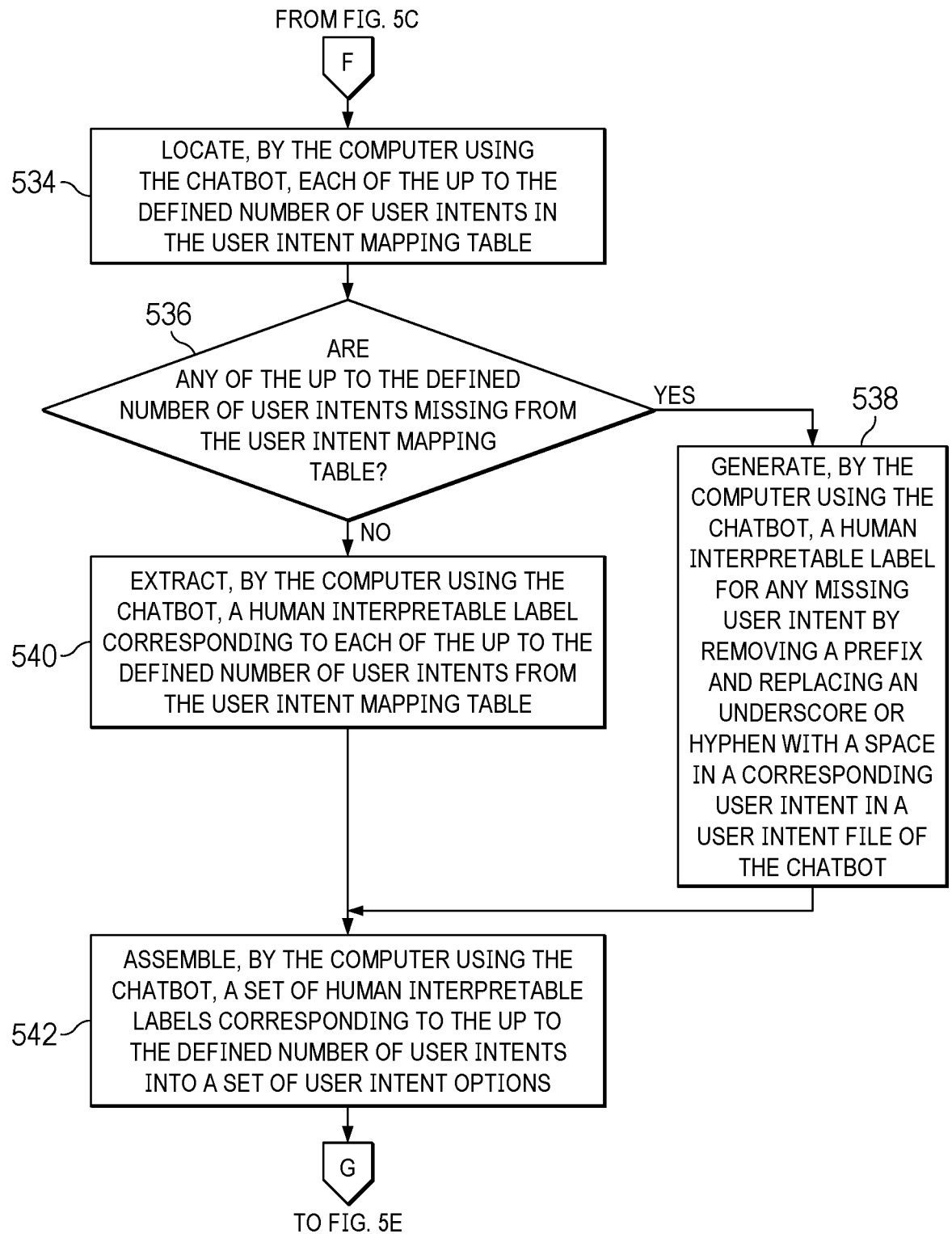
Figure 5E:
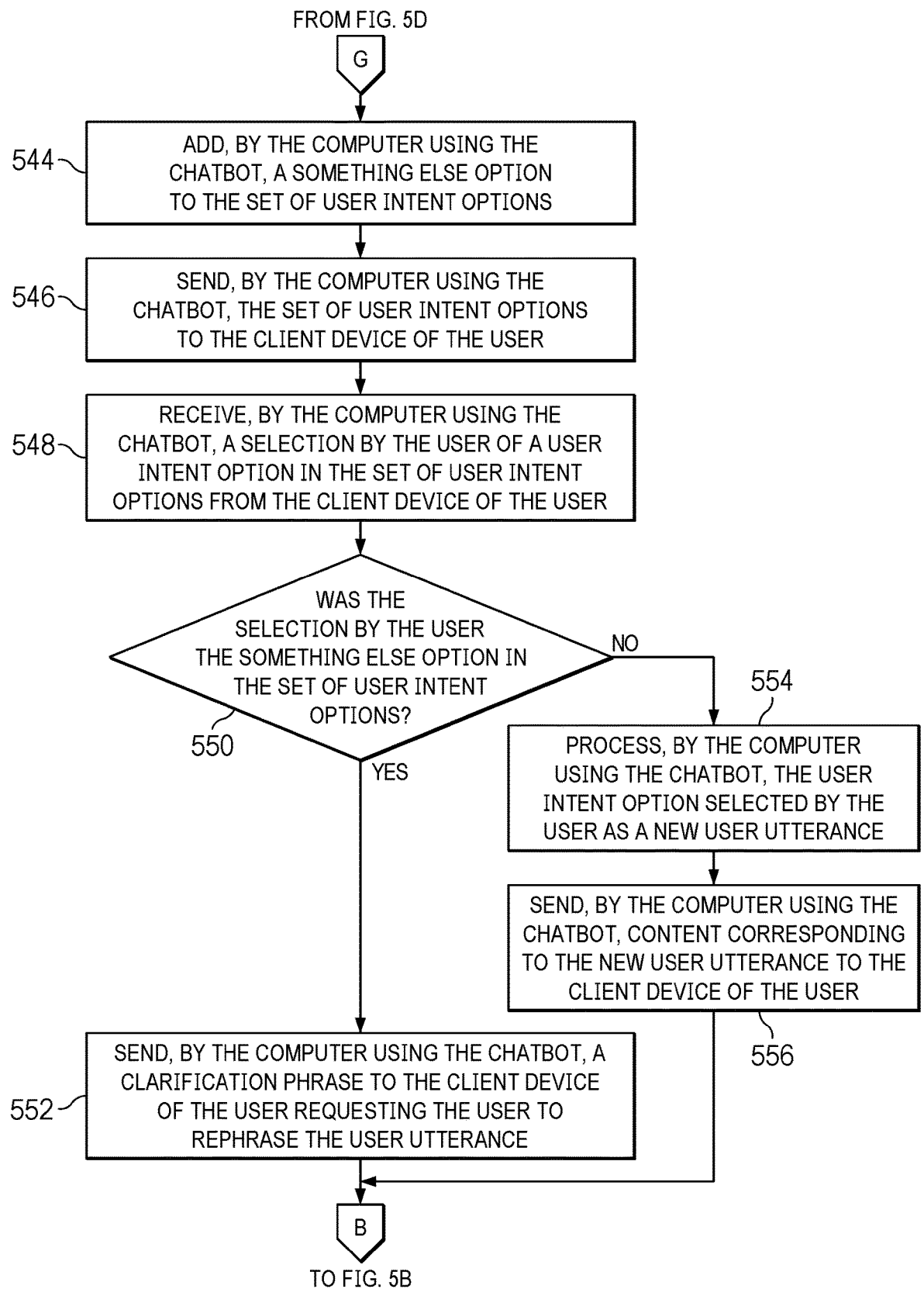

With reference now to FIG. 4, a diagram illustrating an example of a chatbot dialog user interface is depicted in accordance with an illustrative embodiment. Chatbot dialog user interface 400 is implemented in chatbot 402. Chatbot 402 may be, for example, chatbot 218 in FIG. 2. Chatbot 402 presents chatbot dialog user interface 400 to a user of a client device, such as, for example, client 110 in FIG. 1, via a display of the client device.

In this example, chatbot 402 receives user utterance 404, which is "Pay", submitted by the client device user. User utterance 404 may be, for example, user utterance 222 in FIG. 2. Unfortunately, chatbot 402 does not understand the user's intent regarding user utterance 404. As a result, chatbot 402 presents chatbot response 406, which is "Hmm . . . I wasn't able to find an answer for that. :(Let's try rephrasing your question. Remember to be as direct as possible. For example, 'What is may PTO balance?' or 'I forgot to clock in'."

Subsequently, chatbot 402 receives rephrased user utterance 408, which is "ETime". Chatbot 402 responds with chatbot response 410, which is "Did you mean?", and presents user intent options 412, such as, for example, user intent options 238 in FIG. 2. In this example, user intent options 412 include four buttons with text labels of "View Direct Reports in ETime", "Make Historical Timecard Corrections in ETime", "Appoint a Delegate", and "Something Else" as options for the user to select from to disambiguate rephrased user utterance 408.

With reference now to FIGS. 5A-5E, a flowchart illustrating a process for disambiguating user utterances is shown in accordance with an illustrative embodiment. The process shown in FIGS. 5A-5E may be implemented in a computer, such as, for example, server 104 in FIG. 1 or data processing system 200 in FIG. 2. For example, the process can be implemented in chatbot 218 in FIG. 2.

The process begins when the computer receives an input to start a session with a chatbot located on the computer from a client device of a user (step 502). In response to receiving the input to start the session with the chatbot, the computer initializes a user intent mapping table that contains a plurality of user intent names and their corresponding human interpretable labels for the session with the chatbot (step 504). In addition, the computer initializes a first (e.g., low) confidence score threshold level, a second (e.g., medium) confidence score threshold level, and a confidence score range for the session with the chatbot (step 506).

Subsequently, the computer, using the chatbot, receives a user utterance from the client device of the user (step 508). The chatbot can receive the user utterance via, for example, a chatbot dialog user interface, such as chatbot dialog user interface 400 in FIG. 4. The user utterance may be, for example, a request for an answer to a particular question, a request for specified information, or the like.

In response to receiving the user utterance, the computer, using a natural language understanding model of the chatbot, generates a set of possible user intents corresponding to the user utterance (step 510). Further, the computer, using the natural language understanding model of the chatbot, generates a confidence score for each respective user intent in the set of possible user intents corresponding to the user utterance (step 512).

The computer makes a determination as to whether a user intent in the set of possible use intents having a highest confidence score is a generic user intent (step 514). A generic user intent may correspond to, for example, a common "chit chat" user utterance, such as hello, what can you do, or the like. If the computer determines that the user intent in the set of possible use intents having the highest confidence score is a generic user intent, yes output of step 514, then the process proceeds to step 530. If the computer determines that the user intent in the set of possible use intents having the highest confidence score is not a generic user intent, no output of step 514, then the computer makes a determination as to whether each user intent in the set of possible user intents has a corresponding confidence score less than the first confidence score threshold level (step 516). If the computer determines that each user intent in the set of possible user intents does have a corresponding confidence score less than the first confidence score threshold level, yes output of step 516, then the computer, using the natural language understanding model of the chatbot, determines that the user utterance is not interpretable as to possible user intent by the natural language understanding model (step 518). In response to determining that the user utterance is not interpretable as to possible user intent, the computer, using the chatbot, sends a response to the client device of the user indicating that the user utterance needs clarification by the user rephrasing the user utterance (step 520).

Afterward, the computer makes a determination as to whether an input was received from the client device of the user ending the session with the chatbot (step 522). If the computer determines that no input was received from the client device of the user ending the session with the chatbot, no output of step 522, then the process returns to step 508 where the computer, using the chatbot, waits to receive another user utterance. If the computer determines that an input was received from the client device of the user ending the session with the chatbot, yes output of step 522, then the process terminates thereafter.

Returning again to step 516, if the computer determines that no user intent in the set of possible user intents has a corresponding confidence score less than the first confidence score threshold level, no output of step 516, then the computer makes a determination as to whether each user intent in the set of possible user intents has a corresponding confidence score less than the second confidence score threshold level (step 524). If the computer determines that each user intent in the set of possible user intents does have a corresponding confidence score less than the second confidence score threshold level, yes output of step 524, then the computer, using the chatbot, performs disambiguation of the user utterance using up to a defined number of user intents in the set of possible user intents having highest confidence scores between the first confidence score threshold level and the second confidence score threshold level (step 526). Thereafter, the process proceeds to step 534.

Returning again to step 524, if the computer determines that no user intent in the set of possible user intents has a corresponding confidence score less than the second confidence score threshold level, no output of step 524, then the computer makes a determination as to whether multiple user intents in the set of possible user intents have corresponding confidence scores within the confidence score range (step 528). If the computer determines that multiple user intents in the set of possible user intents do not have corresponding confidence scores within the confidence score range, no output of step 528, then the computer, using the chatbot, sends content corresponding to the user intent in the set of possible user intents having the highest confidence score to the client device of the user as a response to the user utterance (step 530). Thereafter, the process returns to step 522 where the computer determines whether the session with the chatbot has ended.

Returning again to step 528, if the computer determines that multiple user intents in the set of possible user intents do have corresponding confidence scores within the confidence score range, yes output of step 528, then the computer, using the chatbot, performs disambiguation of the user utterance using up to the defined number of user intents in the set of possible user intents having corresponding confidence scores within the confidence score range (step 532). In addition, the computer, using the chatbot, locates each of the up to the defined number of user intents in the user intent mapping table (step 534). The computer makes a determination as to whether any of the up to the defined number of user intents in the set of possible user intents having corresponding confidence scores within the confidence score range is missing from the user intent mapping table (step 536). If the computer determines that one or more of the up to the defined number of user intents in the set of possible user intents having corresponding confidence scores within the confidence score range is missing from the user intent mapping table, yes output of step 536, then the computer, using the chatbot, generates a human interpretable label for any missing user intent by removing a prefix (e.g., UC) and replacing an underscore (e.g., _) or hyphen (e.g., -) with a space in a corresponding user intent in a user intent file of the chatbot (step 538). For example, the computer, using the chatbot, can generate a human interpretable label by transforming a user intent, such as, "UC_PTO-Balance" to "PTO Balance". Thereafter, the process proceeds to step 542. If the computer determines that none of the up to the defined number of user intents in the set of possible user intents having corresponding confidence scores within the confidence score range is missing from the user intent mapping table, no output of step 536, then the computer, using the chatbot, extracts a human interpretable label corresponding to each of the up to the defined number of user intents from the intent mapping table (step 540). Furthermore, the computer, using the chatbot, assembles a set of human interpretable labels corresponding to the up to the defined number of user intents into a set of user intent options (step 542). Moreover, the computer, using the chatbot, adds a something else option to the set of user intent options (step 544).

Afterward, the computer, using the chatbot, sends the set of user intent options to the client device of the user (step 546). Subsequently, the computer, using the chatbot, receives a selection by the user of a user intent option in the set of user intent options from the client device of the user (step 548). The computer makes a determination as to whether the selection by the user was the something else option in the set of user intent options (step 550).

If the computer determines that the selection by the user was the something else option in the set of user intent options, yes output of step 550, then the computer, using the chatbot, sends a clarification phrase to the client device of the user requesting the user to rephrase the user utterance (step 552). Thereafter, the process returns to step 522 where the computer determines whether the session with the chatbot has ended. If the computer determines that the selection by the user was not the something else option in the set of user intent options, no output of step 550, then the computer, using the chatbot, processes the user intent option selected by the user as a new user utterance (step 554). In addition, the computer, using the chatbot, sends content corresponding to the new user utterance to the client device of the user (step 556). Thereafter, the process returns to step 522 where the computer determines whether the session with the chatbot has ended.

Figure 6:
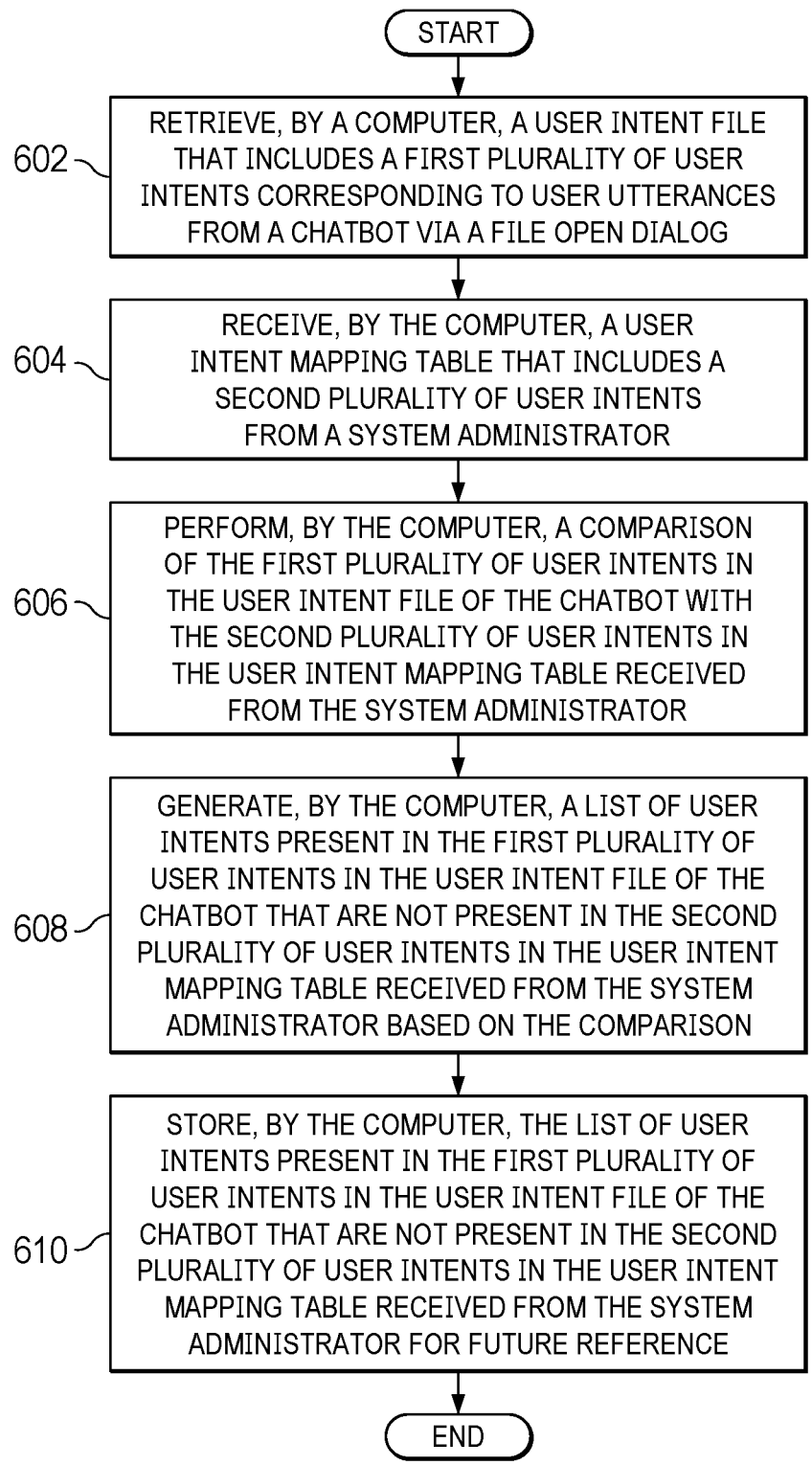
FIG. 6 is a flowchart illustrating a process for generating a list of user intents not present in a user intent mapping table in accordance with an illustrative embodiment.

With reference now to FIG. 6, a flowchart illustrating a process for generating a list of user intents not present in a user intent mapping table is shown in accordance with an illustrative embodiment. The process shown in FIG. 6 may be implemented in a computer, such as, for example, server 104 in FIG. 1 or data processing system 200 in FIG. 2.

The process begins when the computer retrieves a user intent file that includes a first plurality of user intents corresponding to user utterances from a chatbot via a file open dialog (step 602). In addition, the computer receives a user intent mapping table that includes a second plurality of user intents from a system administrator (step 604). Further, the computer performs a comparison of the first plurality of user intents in the user intent file of the chatbot with the second plurality of user intents in the user intent mapping table received from the system administrator (step 606). Furthermore, the computer generates a list of user intents present in the first plurality of user intents in the user intent file of the chatbot that are not present in the second plurality of user intents in the user intent mapping table received from the system administrator based on the comparison (step 608). Moreover, the computer stores the list of user intents present in the first plurality of user intents in the user intent file of the chatbot that are not present in the second plurality of user intents in the user intent mapping table received from the system administrator for future reference (step 610).

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Thus, illustrative embodiments of the present invention provide a computer-implemented method, computer system, and computer program product for disambiguating user utterances to determine user intent by a chatbot. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for disambiguating user utterances, the computer-implemented method comprising:

performing, by a computer comprising one or more processors, a comparison of a first plurality of user intents in a user intent file of a chatbot with a second plurality of user intents in a user intent mapping table;

generating, by the computer, based on the comparison, a list of user intents present in the first plurality of user intents that are not present in the second plurality of user intents of the user intent mapping table;

storing, by the computer, the list of user intents in the user intent mapping table;

performing, by the computer, disambiguation of a user utterance of a user based on a defined number of user intents in a set of possible user intents having highest confidence scores between a first confidence score threshold level and a second confidence score threshold level, wherein the disambiguation is performed in response to a determination that each user intent in the set of possible user intents has a corresponding confidence score less than the second confidence score threshold level;

determining, by the computer, a first user intent of the defined number of user intents is missing from the user intent mapping table, wherein a confidence score corresponding to the first user intent is greater than or equal to the first confidence score threshold level and less than or equal to the second confidence score threshold level;

generating, by the computer responsive to the determination of the first user intent, a human interpretable label for the first user intent by modifying a user intent of the user intent file of the chatbot by replacing one or more portions of the user intent with a predetermined character;

updating, by the computer, the user intent mapping table to include the human interpretable label for the user intent generated responsive to the determination that the first user intent is missing from the user intent mapping table;

locating, by the computer, each user intent of the defined number of user intents in the user intent mapping table;

extracting, by the computer, the human interpretable label corresponding to each of the defined number of user intents located in the user intent mapping table;

assembling, by the computer, a set of human interpretable labels comprising the human interpretable label corresponding to each of the defined number of user intents into a set of user intent options; and sending, by the computer, the set of user intent options to a client device of the user.

2. The computer-implemented method of claim 1 further comprising:

determining, by the computer using the chatbot, that one or more user intents in the set of possible user intents have corresponding confidence scores within a confidence score range in response to the computer determining that no user intent in the set of possible user intents has a corresponding confidence score less than the second confidence score threshold level; and performing, by the computer using the chatbot, disambiguation of the user utterance using the defined number of user intents in the set of possible user intents having corresponding confidence scores within the confidence score range in response to the computer determining that multiple user intents in the set of possible user intents do have corresponding confidence scores within the confidence score range.

3. The computer-implemented method of claim 2 further comprising:

sending, by the computer using the chatbot, content corresponding to a user intent in the set of possible user intents having a highest confidence score to the client device of the user as a response to the user utterance in response to the computer determining that multiple user intents in the set of possible user intents do not have corresponding confidence scores within the confidence score range.

4. The computer-implemented method of claim 1 further comprising:

receiving, by the computer using the chatbot, a selection by the user of a user intent option in the set of user intent options from the client device of the user, the set of user intent options including the set of human interpretable labels corresponding to up to three of the defined number of user intents;

processing, by the computer using the chatbot, the user intent option selected by the user as a new user utterance; and sending, by the computer using the chatbot, content corresponding to the new user utterance to the client device of the user.

5. The computer-implemented method of claim 4 further comprising:

adding, by the computer using the chatbot, a something else option to the set of user intent options;

determining, by the computer using the chatbot, that the selection by the user was the something else option added to the set of user intent options; and sending, by the computer using the chatbot, a clarification phrase to the client device of the user requesting the user to rephrase the user utterance in response to the computer determining that the selection by the user was the something else option added to the set of user intent options.

6. The computer-implemented method of claim 1 further comprising:

receiving, by the computer using the chatbot, an input to start a session with the chatbot located on the computer from the client device of the user;

initializing, by the computer using the chatbot, the user intent mapping table that contains a plurality of user intent names and their corresponding human interpretable labels for the session with the chatbot; and initializing, by the computer using the chatbot, the first confidence score threshold level, the second confidence score threshold level, and a confidence score range for the session with the chatbot.

7. The computer-implemented method of claim 1 further comprising:

receiving, by the computer using the chatbot, the user utterance from the client device of the user;

generating, by the computer using a natural language understanding model of the chatbot, the set of possible user intents corresponding to the user utterance in response to receiving the user utterance; and generating, by the computer using the natural language understanding model of the chatbot, a confidence score for each respective user intent in the set of possible user intents corresponding to the user utterance.

8. The computer-implemented method of claim 1 further comprising:

determining, by the computer using the chatbot, that each user intent in the set of possible user intents has a corresponding confidence score less than the first confidence score threshold level;

determining, by the computer using a natural language understanding model of the chatbot, that the user utterance is not interpretable as to possible user intent in response to the computer determining that each user intent in the set of possible user intents does have a corresponding confidence score less than the first confidence score threshold level; and sending, by the computer using the chatbot, a response to the client device of the user indicating that the user utterance needs clarification by the user rephrasing the user utterance.

9. The computer-implemented method of claim 1 further comprising:

determining, by the computer using the chatbot, a user intent in the set of possible user intents having a highest confidence score is a generic user intent; and sending, by the computer using the chatbot, content corresponding to the user intent in the set of possible user intents having the highest confidence score to the client device of the user as a response to the user utterance in response to the computer determining that the user intent in the set of possible user intents having the highest confidence score is a generic user intent.

10. The computer-implemented method of claim 1 wherein generating the human interpretable label for the first user intent comprises removing a prefix and replacing an underscore or hyphen with a space in a corresponding user intent of the user intent file of the chatbot.

11. The computer-implemented method of claim 1 further comprising:
   retrieving, by the computer using the chatbot, the user intent file that includes the first plurality of user intents corresponding to user utterances from the chatbot via a file open dialog; and
   receiving, by the computer, the user intent mapping table that includes the second plurality of user intents from a system administrator.

12. A computer system for disambiguating user utterances, the computer system comprising:
   a bus system;
   a storage device connected to the bus system, wherein the storage device stores program instructions; and
   a processor connected to the bus system, wherein the processor executes the program instructions to:
      perform a comparison of a first plurality of user intents in a user intent file of a chatbot with a second plurality of user intents in a user intent mapping table;
      generate based on the comparison, a list of user intents present in the first plurality of user intents that are not present in the second plurality of user intents;
      store the list of user intents in the user intent mapping table;
      perform disambiguation of a user utterance of a user based on a defined number of user intents in a set of possible user intents having highest confidence scores between a first confidence score threshold level and a second confidence score threshold level, wherein the disambiguation is performed responsive to a determination that each user intent in the set of possible user intents does have a corresponding confidence score less than the second confidence score threshold level;
      determine a first user intent of the defined number of user intents is missing from the user intent mapping table, wherein a confidence score corresponding to the first user intent is greater than or equal to the first confidence score threshold level and less than or equal to the second confidence score threshold level;
      generate responsive to the determination of the first user intent, a human interpretable label for the first user intent by modifying a user intent of the user intent file of the chatbot by removing one or more portions of the user intent;
      update the user intent mapping table to include the human interpretable label for the user intent generated responsive to the determination that the first user intent is missing from the user intent mapping table;
      locate each user intent of the defined number of user intents in the user intent mapping table;
      extract a human interpretable label corresponding to each of the defined number of user intents located in the user intent mapping table;
      assemble a set of human interpretable labels comprising the human interpretable label corresponding to each of the defined number of user intents into a set of user intent options; and
      send the set of user intent options to a client device of the user.

13. The computer system of claim 12, wherein the processor further executes the program instructions to:
   determine, using the chatbot, that one or more user intents in the set of possible user intents have corresponding confidence scores within a confidence score range in response to determining that no user intent in the set of possible user intents has a corresponding confidence score less than the second confidence score threshold level; and
   perform, using the chatbot, disambiguation of the user utterance using the defined number of user intents in the set of possible user intents having corresponding confidence scores within the confidence score range in response to determining that multiple user intents in the set of possible user intents do have corresponding confidence scores within the confidence score range.

14. The computer system of claim 13, wherein the processor further executes the program instructions to:
   send, using the chatbot, content corresponding to a user intent in the set of possible user intents having a highest confidence score to the client device of the user as a response to the user utterance in response to determining that multiple user intents in the set of possible user intents do not have corresponding confidence scores within the confidence score range.

15. The computer system of claim 12, wherein the processor further executes the program instructions to:
   receive, using the chatbot, a selection by the user of a user intent option in the set of user intent options from the client device of the user;
   process, using the chatbot, the user intent option selected by the user as a new user utterance; and
   send, using the chatbot, content corresponding to the new user utterance to the client device of the user.

16. The computer system of claim 15, wherein the processor further executes the program instructions to:
   add, using the chatbot, a something else option to the set of user intent options;
   determine, using the chatbot, that the selection by the user was the something else option added to the set of user intent options; and
   send, using the chatbot, a clarification phrase to the client device of the user requesting the user to rephrase the user utterance in response to determining that the selection by the user was the something else option added to the set of user intent options.

17. The computer system of claim 12, wherein the processor further executes the program instructions to:
   receive, using the chatbot, an input to start a session with the chatbot located on the computer system from the client device of the user;
   initialize, using the chatbot, the user intent mapping table that contains a plurality of user intent names and their corresponding human interpretable labels for the session with the chatbot; and
   initialize, using the chatbot, the first confidence score threshold level, the second confidence score threshold level, and a confidence score range for the session with the chatbot.

18. The computer system of claim 12, wherein the processor further executes the program instructions to:
   receive, using the chatbot, the user utterance from the client device of the user;
   generate, using a natural language understanding model of the chatbot, the set of possible user intents corresponding to the user utterance in response to receiving the user utterance; and
   generate, using the natural language understanding model of the chatbot, a confidence score for each respective user intent in the set of possible user intents corresponding to the user utterance.

19. The computer system of claim 12, wherein the processor further executes the program instructions to:
   determine, using the chatbot, that each user intent in the set of possible user intents has a corresponding confidence score less than the first confidence score threshold level;
   determine, using a natural language understanding model of the chatbot, that the user utterance is not interpretable as to possible user intent in response to determining that each user intent in the set of possible user intents does have a corresponding confidence score less than the first confidence score threshold level; and
   send, using the chatbot, a response to the client device of the user indicating that the user utterance needs clarification by the user rephrasing the user utterance.

20. A computer program product for disambiguating user utterances, the computer program product comprising a computer readable storage medium having program instructions embodied therewith, the program instructions executable by a computer to cause the computer to perform a method of:
   performing, by the computer, a comparison of a first plurality of user intents in a user intent file of a chatbot with a second plurality of user intents in a user intent mapping table;
   generating, by the computer, based on the comparison, a list of user intents present in the first plurality of user intents that are not present in the second plurality of user intents;
   storing, by the computer, the list of user intents in the user intent mapping table;
   performing, by the computer, disambiguation of a user utterance of a user based on a defined number of user intents in a set of possible user intents having highest confidence scores between a first confidence score threshold level and a second confidence score threshold level, wherein the disambiguation is performed responsive to a determination that each user intent in the set of possible user intents does have a corresponding confidence score less than the second confidence score threshold level;
   determining, by the computer, a first user intent of the defined number of user is missing from the user intent mapping table, wherein a confidence score corresponding to the first user intent is greater than or equal to the first confidence score threshold level and less than or equal to the second confidence score threshold level;
   generating, by the computer, responsive to the determination of the first user intent, a human interpretable label for the first user intent by modifying a user intent of the user intent file of the chatbot by replacing a portion of the user intent with a predetermined phrase;
   updating, by the computer, the user intent mapping table to include the human interpretable label for the user intent generated responsive to the determination that the first user intent is missing from the user intent mapping table;
   locating, by the computer, each user intent of the defined number of user intents in the user intent mapping table;
   extracting, by the computer, the human interpretable label corresponding to each of the defined number of user intents located in the user intent mapping table;
   assembling, by the computer, a set of human interpretable labels comprising the human interpretable label corresponding to each of the defined number of user intents into a set of user intent options; and
   sending, by the computer, the set of user intent options to a client device of the user.

21. The computer program product of claim 20 further comprising:
   determining, by the computer using the chatbot, that one or more user intents in the set of possible user intents have corresponding confidence scores within a confidence score range in response to the computer determining that no user intent in the set of possible user intents has a corresponding confidence score less than the second confidence score threshold level; and
   performing, by the computer using the chatbot, disambiguation of the user utterance using the defined number of user intents in the set of possible user intents having corresponding confidence scores within the confidence score range in response to the computer determining that multiple user intents in the set of possible user intents do have corresponding confidence scores within the confidence score range.

22. The computer program product of claim 21 further comprising:
   sending, by the computer using the chatbot, content corresponding to a user intent in the set of possible user intents having a highest confidence score to the client device of the user as a response to the user utterance in response to the computer determining that multiple user intents in the set of possible user intents do not have corresponding confidence scores within the confidence score range.

23. The computer program product of claim 20 further comprising:
   receiving, by the computer using the chatbot, a selection by the user of a user intent option in the set of user intent options from the client device of the user;
   processing, by the computer using the chatbot, the user intent option selected by the user as a new user utterance; and
   sending, by the computer using the chatbot, content corresponding to the new user utterance to the client device of the user.

24. The computer program product of claim 23 further comprising:
   adding, by the computer using the chatbot, a something else option to the set of user intent options;
   determining, by the computer using the chatbot, that the selection by the user was the something else option added to the set of user intent options; and
   sending, by the computer using the chatbot, a clarification phrase to the client device of the user requesting the user to rephrase the user utterance in response to the computer determining that the selection by the user was the something else option added to the set of user intent options.

25. The computer program product of claim 20 further comprising:
   receiving, by the computer using the chatbot, an input to start a session with the chatbot located on the computer from the client device of the user;
   initializing, by the computer using the chatbot, the user intent mapping table that contains a plurality of user intent names and their corresponding human interpretable labels for the session with the chatbot; and
   initializing, by the computer using the chatbot, the first confidence score threshold level, the second confidence score threshold level, and a confidence score range for the session with the chatbot.

26. The computer program product of claim 20 further comprising:
- receiving, by the computer using the chatbot, the user utterance from the client device of the user;
- generating, by the computer using a natural language understanding model of the chatbot, the set of possible user intents corresponding to the user utterance in response to receiving the user utterance; and
- generating, by the computer using the natural language understanding model of the chatbot, a confidence score for each respective user intent in the set of possible user intents corresponding to the user utterance.

27. The computer program product of claim 20 further comprising:
- determining, by the computer using the chatbot, that each user intent in the set of possible user intents has a corresponding confidence score less than the first confidence score threshold level;
- determining, by the computer using a natural language understanding model of the chatbot, that the user utterance is not interpretable as to possible user intent in response to the computer determining that each user intent in the set of possible user intents does have a corresponding confidence score less than the first confidence score threshold level; and
- sending, by the computer using the chatbot, a response to the client device of the user indicating that the user utterance needs clarification by the user rephrasing the user utterance.

28. A method for disambiguating user utterances, the method comprising:
- performing, by one or more processors coupled with memory, a comparison of a first plurality of user intents in a user intent file of a chatbot with a second plurality of user intents in a user intent mapping table;
- generating, by the one or more processors, a list of user intents present in the first plurality of user intents that are not present in the second plurality of user intents;
- storing, by the one or more processors, the list of user intents in the user intent mapping table;
- performing, by the one or more processors, disambiguation of a user utterance of a user using a set of possible user intents having highest confidence scores between a first confidence score threshold level and a second confidence score threshold level, wherein the disambiguation is performed responsive to a determination that each user intent in the set of possible user intents does have a corresponding confidence score less than the second confidence score threshold level;
- determining, by the one or more processors, a first user intent of the set of possible user intents is missing from the user intent mapping table, wherein a confidence score corresponding to the first user intent is greater than or equal to the first confidence score threshold level and less than or equal to the second confidence score threshold level;
- generating, by the one or more processors, responsive to the determination of the first user intent, a human interpretable label for the first user intent by modifying a user intent of the user intent file of the chatbot;
- updating, by the one or more processors, the user intent mapping table to include the human interpretable label for the user intent generated responsive to the determination that the first user intent is missing from the user intent mapping table;
- locating, by the one or more processors, each of the set of possible user intents in the user intent mapping table;
- extracting, by the one or more processors, a label corresponding to each of the set of possible user intents located in the user intent mapping table;
- assembling, by the one or more processors, a set of labels comprising the labels corresponding to each of the set of possible user intents into a set of user intent options; and
- sending, by the one or more processors, the set of user intent options to a client device of the user.

29. The method of claim 28 further comprising:
- determining that one or more user intents in the set of possible user intents have corresponding confidence scores within a confidence score range in response to determining that no user intent in the set of possible user intents has a corresponding confidence score less than the second confidence score threshold level; and
- performing disambiguation of the user utterance using a defined number of user intents in the set of possible user intents having corresponding confidence scores within the confidence score range in response to determining that multiple user intents in the set of possible user intents do have corresponding confidence scores within the confidence score range.

30. The method of claim 28, wherein a configurable confidence score range is utilized for each of the first confidence score threshold level and the second confidence score threshold level.

* * * * *